United States Patent [19]

Herden

[11] 4,326,419
[45] Apr. 27, 1982

[54] ELECTROMECHANICAL PRESSURE TRANSDUCER

[75] Inventor: Werner Herden, Stuttgart, Fed. Rep. of Germany

[73] Assignee: Robert Bosch GmbH, Stuttgart, Fed. Rep. of Germany

[21] Appl. No.: 122,042

[22] Filed: Feb. 19, 1980

[30] Foreign Application Priority Data

Apr. 6, 1979 [DE] Fed. Rep. of Germany ....... 2913935

[51] Int. Cl.³ .............................................. G01L 19/04
[52] U.S. Cl. ........................................ 73/708; 73/728
[58] Field of Search ................. 73/708, 728, 722, 754, 73/DIG. 3; 336/30

[56] References Cited

U.S. PATENT DOCUMENTS

| | | | |
|---|---|---|---|
| 3,286,528 | 11/1966 | Jullien-Davin | 73/754 |
| 3,575,054 | 4/1971 | Glista | 73/DIG. 3 |
| 3,848,180 | 11/1974 | Jonke et al. | 73/728 |
| 4,077,262 | 3/1978 | Cholet | 73/722 |
| 4,099,238 | 7/1978 | Suzuki | 73/DIG. 3 |

Primary Examiner—Donald O. Woodiel
Attorney, Agent, or Firm—Frishauf, Holtz, Goodman & Woodward

[57] ABSTRACT

An electromechanical transducer for transforming pressure fluctuations into varying electrical signals, especially for use as the induction tube pressure sensor for an internal combustion engine. A Hall-effect sensor moves within a local magnetic field to detect changes in pressure which alter the configuration of a diaphragm or diaphragm bellows to which the Hall-generator is attached. In order to suppress temperature-dependent terms in the Hall voltage equation, the invention provides for periodically alternating energization of the electromagnets, i.e., for alternation or alternating shut-off of the magnetic field. The Hall voltages measured during the two states of the magnetic field are subtracted from one another, thereby eliminating the temperature-dependent term. A number of configurations of the transducer elements is presented.

10 Claims, 8 Drawing Figures

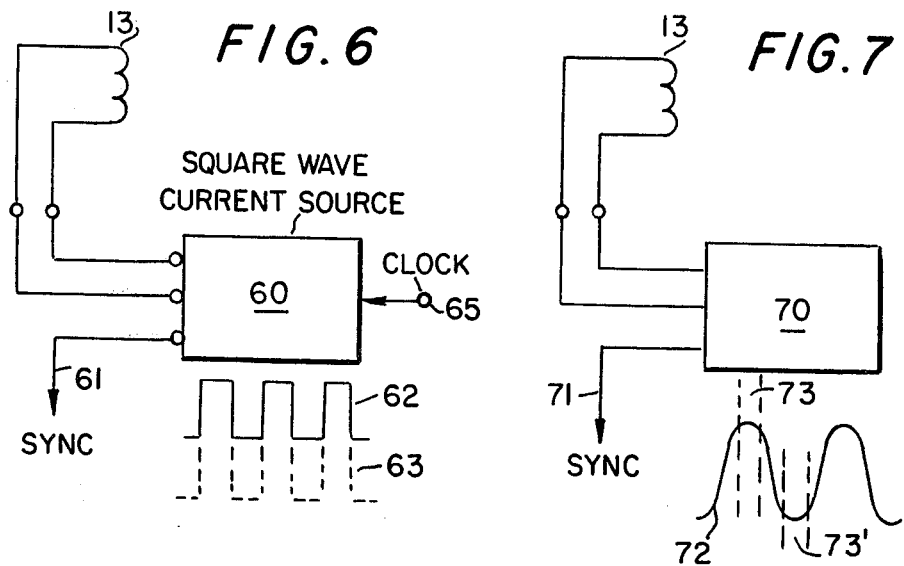
FIG. 6
FIG. 7
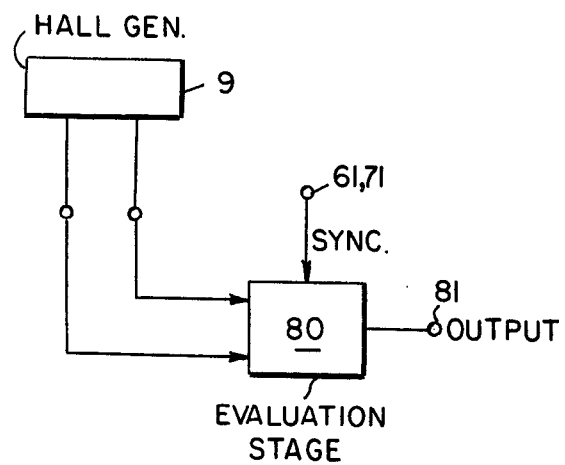
FIG. 8

# ELECTROMECHANICAL PRESSURE TRANSDUCER

FIELD OF THE INVENTION

The invention relates to a pressure transducer, in particular a transducer for converting pressure fluctuations to electrical signals on the basis of electromechanical interactions. The transducer employs a Hall-effect generator with provisions for temperature-dependent null offset compensation.

BACKGROUND OF THE INVENTION AND PRIOR ART

An electromechanical transducer for converting pressure fluctuations into electrical signals is known, for example, from the German Disclosure Document DE OS No. 1 673 938. The transducer described there includes a permanent magnet and a semiconductor element, namely a Hall generator, whose electrical response is dependent on the strength of the magnetic field. The transducer has an air gap which is entered by an adjustment component which alters the flux lines in the air gap. Transducers of this type require very high precision during manufacture and during adjustment. When installed in motor vehicles, they require additional expensive protection to prevent contamination by dirt. A still further detrimental feature of the Hall-generator known in the art is a distinct temperature dependence, resulting in different output signals at equal pressures but different temperatures.

THE INVENTION

It is a principal object of the present invention to provide an electromechanical pressure transducer of the general type described above but improved with respect thereto so as generate an output signal which is substantially independent of temperature changes. An associated object is to provide a constant current Hall-generator which makes possible the elimination of offset voltages in the Hall-effect amplifiers, thereby resulting in reliable long-term stability.

Briefly, a Hall generator is coupled to a diaphragm subjected to variable pressure, to move therewith. The Hall generator is positioned in a magnetic field, so that, upon movement of the diaphragm, and hence of the Hall generator, the output from the Hall generator will vary. In accordance with the invention, and in order to eliminate temperature effects on the output of the Hall generator, an electromagnetic is provided to generate the magnetic field which is energized such that the polarity of the magnetic field is discontinuous, for example by a pulsed current, preferably square wave, but which may be sinusoidal, and which may change polarity. The output of the Hall generator is then evaluated in an evaluation stage by comparing the output of the Hall generator when subjected to the field, or when deflected in the absence or discontinuance of the field—or, if field reversal is commanded by a sinusoidally varying source, the output of the Hall generator is compared when the magnetic field is in one direction with respect to its output in another direction. Offset, or zero deflection, or quiescent current variations in the Hall generator due to temperature changes are thus compensated, and an overall output signal can be obtained which is independent of temperature.

THE DRAWING

FIG. 6 is a highly schematic drawing of an energization system for the electromagnet utilizing square-wave pulses;

FIG. 7 is a highly schematic drawing of an energization system for the electromagnet using a sinusoidal excitation current; and FIG. 8 is a highly schematic diagram illustrating evaluation of the output signal from the Hall generator while eliminating temperature effects.

DESCRIPTION OF THE PREFERRED EMBODIMENTS

Figure 1:
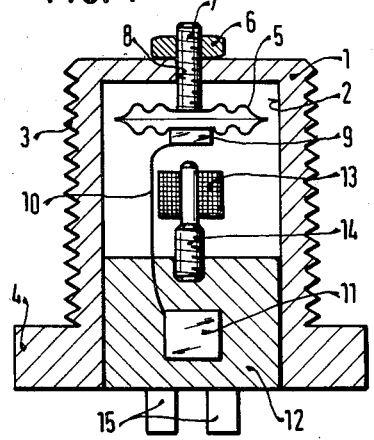
FIG. 1 is an axial section of a first embodiment of the transducer according to the invention.

The pressure transducer illustrated in FIG. 1 is generally intended for installation in the induction tube of an internal combustion engine (not shown) and includes an outer metallic housing 1 having a central cavity 2 and external screw threads 3 for engagement with suitable screw threads in an aperture of the induction tube of the engine. The threaded engagement of the transducer with the induction tube is aided by the provision of a hexagonal bolt head 4. Disposed in the interior of the housing 1 is a diaphragm bellows 5 held in place on a threaded pin 7 which is held within a bore 8 of the housing and secured there by a nut 6. Attached to the side of the bellows remote from the bore 8 is a Hall-generator element 9. The diaphragm deflects essentially along a deflection axis transverse to its major plane. In a preferred embodiment the Hall-generator 9 is part of a monolithic, integrated semiconductor circuit, which may preferably also include a constant current source and a suitable D.C. amplifier for the Hall-generator signal. The Hall-generator 9 is connected via flexible wires 10 with a processor circuit 11 which may be a hybrid circuit that is shown to be disposed in an elastic damping compound 12 for protection against vibrations and shocks. An electromagnet 13 is disposed within the housing 4 on an adjustable screw 14 generally opposite the Hall-generator 9. The exact axial position of the electromagnet 13 can be set by suitable rotation of the set screw 14. External electrical contacts 15 serve to conduct electrical currents to and from the transducer.

The pressure-related signal of the transducer is generated by relative motion between the Hall-generator 9 and the electromagnet 13. This relative motion is due to pressure changes causing volumetric changes in the diaphragm bellows 5 so as to change the axial distance between the Hall-generator 9 and the locally stationary electromagnet 13. The design and position of the electromagnet 13 are preferably such that the Hall-generator 9 finds itself located at the peak of a steep gradient of the magnetic field strength so as to cause the occurrence of sufficient differences in the Hall voltage for even small displacements of the diaphragm bellows, typically 0.5-1 mm. The Hall voltage due to a Hall-generator operating at constant current obeys the following equation.

$$u_H = u_o + (k \cdot B \cdot I) = R_{HL}I + (k \cdot B \cdot I)$$

In the above equation, $u_o$ is the Hall voltage without an applied magnetic field, k is the Hall constant, B is the magnetic field strength, I is the exciter current of the Hall-generator and $R_{HL}$ is the effective resistance of the semiconductor material. The voltage $u_o$ depends on the temperature of the Hall-generator, so that the zero point of the transducer drifts substantially with ambient temperature. It is the express object of the present invention to compensate for the temperature dependence of this transducer.

In accordance with the invention, the magnetic field B is either turned off or changed in polarity at periodic intervals, preferably by employing a constant square wave current. The temperature-dependent component $u_o$ is eliminated by forming the difference between the Hall voltage with and without a magnetic field or, alternatively, by measuring the Hall voltage with a positive and negative magnetic field. The remaining signal is then proportional to (k·B·I) when the magnetic field is turned on and off or proportional to 2(k·B·I) when the polarity of the field is changed. The formation of the difference of the two output signals eliminates the term $u_o$ and thus eliminates the temperature dependence of the output signal from the transducer.

The control of the transducer and the processing of the Hall signals may take place, for example, by an already present electronic ignition controller which would be connected to supply the periodically changing square wave for exciting the electromagnet and would receive the Hall-generator output signal for suitable formation of the above-identified difference.

It is also possible to construct the transducer with a built-in integrated circuit already containing a clock generator, a timed constant current source, the Hall-generator and its amplifiers, as well as a signal processor circuit so as to make the transducer completely independent of any ignition controller which may be present in the motor vehicle containing the internal combustion engine.

It is also possible to obtain the aforementioned results by supplying the electromagnet with a conventional alternating current, for example a sinusoidal current. In that case however, the differences of Hall signals must be obtained by measurements taking place at points of equal phase, for example at the maxima of the sinusoidal signal.

Figure 2:
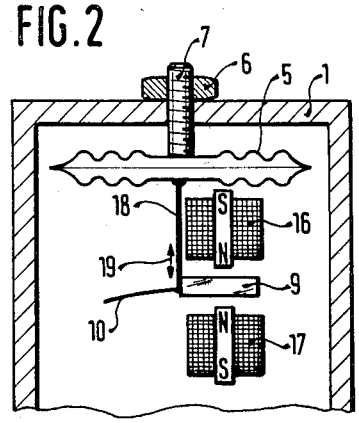
FIGS. 2-5 illustrate, respectively, variants of the transducer according to the invention.

A variant of the embodiment illustrated in FIG. 1 is shown in FIG. 2 in which similar elements retain the reference numerals of FIG. 1. In order to linearize the generally hyperbolic Hall voltage as a function of pressure which is obtained by the use of a single magnet, it is proposed in the variant of FIG. 2 to provide two electromagnets 16, 17 with equal opposing poles, shown in FIG. 2 as opposing north poles and by positioning the Hall-generator 9 therebetween. This construction provides for a central magnetic field B=0 with a very steep gradient, permitting easy centering of the Hall element. The Hall element 9 is attached to a pin 18 which is mounted on the diaphragm bellows 5 and moves in the direction of the arrow 19 when pressure changes occur. In the embodiment of FIG. 2, both magnets 16 and 17 are substantially stationary with respect to the housing 1.

Figure 3:
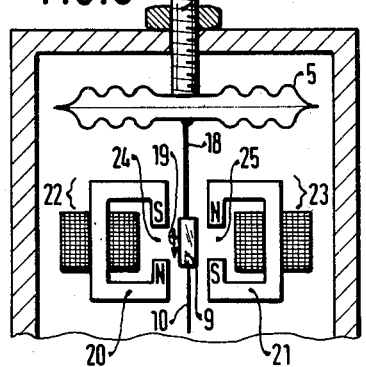

In a variant of the invention illustrated in FIG. 3, the Hall-generator 9 moves axially along the arrow 19 in the field generated by two electromagnets 22, 23 provided with C-shaped cores 20, 21, respectively. These cores define air gaps 24, 25, respectively, which lie adjacent to the Hall-generator 9. The polarity of the electromagnets 22, 23 is such that neighboring poles are unequal in both the axial as well as the transverse directions.

Figure 4:
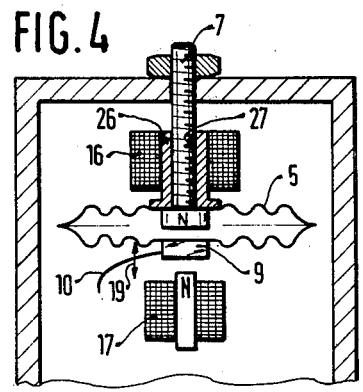

Still another embodiment of the invention is illustrated in FIG. 4 in which the electromagnet 16 is fixedly mounted on the pin 7 that also carries the diaphragm bellows 5 in a suitable bore 27 of the core 26. The effective pole piece of the electromagnet 16 actually protrudes into the bellows 5 and lies opposite the Hall-generator 9 attached to the underside thereof. The electromagnet 17, located opposite the Hall-generator 9, is stationary with respect to the housing 1.

Figure 5:
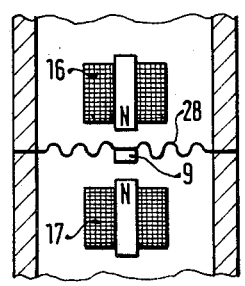

In still another embodiment of the invention, illustrated in FIG. 5, a single diaphragm 28 is clamped in the housing and carries a centrally disposed Hall-generator 9. The electromagnet 16 is located above the diaphragm 28 and the electromagnet 17 is located below the diaphragm 28 at equal axial distances from the Hall-generator 9. One of the two chambers defined by the diaphragm 28 and the housing 1 would be hermetically closed or opened to atmosphere while the other would communicate with the induction tube of the engine.

The electromagnet 13 (FIG. 1) or any one of the other electromagnets 16, 17 (FIGS. 2, 4, 5) or 20–23 (FIG. 3) can be energized by a square-wave current source 60 by connecting the electromagnetic coil to the output from the current source. As shown in FIG. 6, the output can be either a square-wave pulse source which is unidirectional, as illustrated at 62, or can be a varying square-wave pulse source as illustrated in broken line 63, that is, the polarity of the square-wave pulse can change. The frequency of the square-wave pulses is controlled by a clock source 65 which, for example, can obtain clock signals from an electronic ignition controller already present in an externally ignited combustion engine system, or may be derived from a separate clock generator, as discussed above. A synchronizing signal is obtained from a terminal 61, to synchronize the output signal from the Hall generator 9 upon evaluation, as will appear.

The signal may, however, also be sinusoidal, as illustrated in FIG. 7, where a sinusoidal wave generator 7 provides sinusoidal output power in accordance with the wave form 72. A synchronizing line 71 provides synchronizing signals occurring during peaks 73, 73' of the sinusoidal signal.

The output from the Hall generator 9 is evaluated in an evaluation stage 80, FIG. 8, which receives the synchronizing signals from terminal 61 or 71, FIG. 6 or 7 respectively. As is well known, the Hall generator—apart from energizing lines—usually has two output terminals which, respectively, are either "high" or "low", depending on the polarity of the applied magnetic field. The evaluation stage, then, merely stores the output from one of the terminals, for example with respect to a reference, and compares it upon receipt of a subsequent synchronization pulse from terminals 61, 71 with the next output from the Hall generator. If the energization is in accordance with the full-line signal 62 of FIG. 6, the comparison can be made in accordance with the proportionality (k·B·I); if the magnetic field changes polarity, for example as controlled by the signal shown in broken lines 63 of FIG. 6, or the signal 72 of FIG. 7, the proportionality will be in accordance with 2(k·B·I). The evaluation stage, of course, can be constructed in accordance with any well known and standard circuits, including, for example, a "sample and hold" stage, a comparator, for example an operational amplifier connected in a comparison circuit, a bidirectional integrator, or the like. Any well known and suitable circuit which generates a difference signal obtained during difference states of energization of the magnet is suitable. The output signal obtained at output terminal 81 then will be independent of temperature.

Features of one embodiment may be used with those of any other and the invention is subject to changes and variations within the competence of a person skilled in the art without departing from scope.

I claim:

1. A transducer system for generating a pressure-dependent electrical output signal having
    a housing (1) including therein at least one deformable diaphragm (5) subjected to a variable pressure and deflecting along a predetermined deflection axis;
    at least one electromagnet (13; 16, 17; 20-23) for generating a magnetic field along said axis, when energized;
    a Hall-effect sensor (9) located along said axis and secured to the membrane to obtain an output signal from the Hall-effect sensor as a function of the position of said Hall effect sensor in said magnetic field;
    means (60, 70) to discontinuously energize the electromagnet in a predetermined polarity to thereby generate a field of discontinuous predetermined polarity to which said Hall-effect sensor is subjected;
    and means (80) to evaluate the output signal of said Hall-effect sensor at the time of energization in said predetermined direction with respect to the signal absent energization in said predetermined direction to derive an output signal therefrom and thereby to eliminate the effect of temperature on the output signal from the system.

2. System according to claim 1, wherein said means for discontinuously energizing the electromagnet comprises
    a source (70, 60) for providing a periodically alternating energization current for said magnet.

3. A transducer system according to claim 2, wherein said current source (60) generates a square wave current.

4. A transducer system according to claim 2, wherein said current source (70) generates a periodically alternating wave current.

5. System according to claim 1, wherein the evaluation means comprises means (80) for generating the difference of signals obtained during different states of energization of said electromagnet to obtain an electrical output signal in which temperature-dependent terms are absent.

6. A transducer system according to claim 1, wherein said at least one magnet is two electromagnets so disposed that identical magnetic poles are adjacent to one another and said Hall-effect sensor is disposed therebetween.

7. A transducer system according to claim 1, wherein said Hall-effect sensor is attached to said deformable diaphragm.

8. A transducer system according to claim 1, wherein said at least one magnet is stationary with respect to said housing.

9. A transducer system according to claim 1, wherein said at least one deformable diaphragm is a double-walled diaphragm bellows, one wall of which is stationary with respect to said housing and the other wall of which is movable subject to said pressure and supports said Hall-effect sensor.

10. System according to claim 1, wherein said energization means (60) provides unidirectional sequential pulses to the at least one electromagnet.

* * * * *